(12) United States Patent
Sugiyama et al.

(10) Patent No.: US 10,423,014 B2
(45) Date of Patent: Sep. 24, 2019

(54) OPTICAL MODULE AND OPTICAL MODULATOR

(71) Applicant: FUJITSU OPTICAL COMPONENTS LIMITED, Kawasaki-shi, Kanagawa (JP)

(72) Inventors: Masaki Sugiyama, Kawasaki (JP); Shinji Maruyama, Sapporo (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 16/174,644

(22) Filed: Oct. 30, 2018

(65) Prior Publication Data

US 2019/0162984 A1  May 30, 2019

(30) Foreign Application Priority Data

Nov. 27, 2017 (JP) .................................. 2017-226923

(51) Int. Cl.
*G02F 1/01* (2006.01)

(52) U.S. Cl.
CPC ............ *G02F 1/011* (2013.01); *G02F 1/0121* (2013.01)

(58) Field of Classification Search
CPC ........ G02F 1/011; G02F 1/025; G02F 1/0121; G02F 1/03; G02F 1/0305; G02F 1/0316; G02F 1/0327; G02F 1/0344; G02F 1/035; G02F 1/0356; G02F 1/2257; G02F 2001/212; G02B 6/125; G02B 2006/12142; G02B 2006/12159
See application file for complete search history.

(56) References Cited

U.S. PATENT DOCUMENTS 7,286,727 B2 * 10/2007 Sugiyama ............... G02F 1/035
385/14
2006/0056002 A1  3/2006 Wooten et al.
2012/0251029 A1  10/2012 Kobrinsky et al.

FOREIGN PATENT DOCUMENTS

JP          2012163876       8/2012

* cited by examiner

*Primary Examiner* — John Bedtelyon
(74) *Attorney, Agent, or Firm* — Staas & Halsey LLP

(57) ABSTRACT

An optical modulator includes: an optical modulator chip having an optical waveguide having a bent waveguide portion that is bent between a light input end portion and a light output end portion, a bias electrode provided between the light input end portion and the bent waveguide portion along the optical waveguide, and a signal electrode provided between the bent waveguide portion and the light output end portion along the optical waveguide; a bias input terminal configured to input a bias voltage, the bias input terminal being electrically connected to the bias electrode, and a signal input terminal configured to input an electric signal, the signal input terminal being provided closer to a receiver configured to receive an electric signal than the bias input terminal and being electrically connected to the signal electrode.

16 Claims, 8 Drawing Sheets

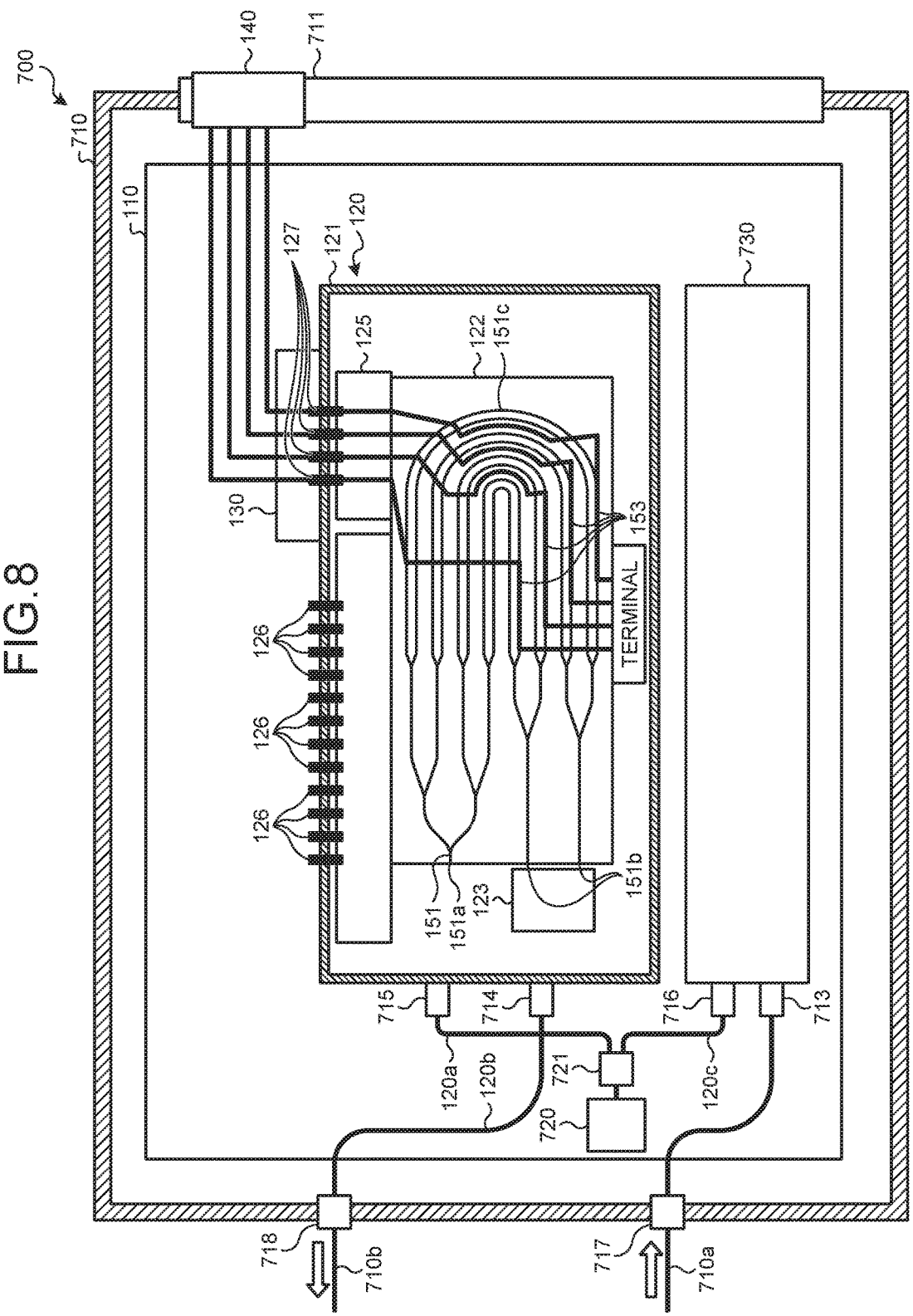

OPTICAL MODULE AND OPTICAL MODULATOR

CROSS-REFERENCE TO RELATED APPLICATION

This application is based upon and claims the benefit of priority of the prior Japanese Patent Application No. 2017-226923, filed on Nov. 27, 2017, the entire contents of which are incorporated herein by reference.

FIELD

The embodiments discussed herein are related to an optical module and an optical modulator.

BACKGROUND

Conventionally, in an optical module equipped with an optical modulator for modulating light, an input optical fiber and an output optical fiber are respectively connected in series on both sides of the optical modulator. However, when the input optical fiber and the output optical fiber are respectively connected to both sides of the optical modulator, the mounting area of the optical modulator is increased.

Therefore, in the optical module, connecting, to one side of the optical modulator, the input optical fiber and the output optical fiber disposed in parallel sometimes reduces the mounting area.

In the optical module that connects, to one side of the optical modulator, the input optical fiber and the output optical fiber disposed in parallel, the direction of light is changed between an end portion of the input optical fiber and an end portion of the output optical fiber. That is, for example, a bent portion is provided in an optical waveguide on an optical modulator chip, and the bent portion of the optical waveguide folds back light between the end portion of the input optical fiber and the end portion of the output optical fiber. At this time, a radio frequency (RF) electrode for high-frequency signal for modulating light is disposed closer to the end portion of the input optical fiber than the bent portion along the optical waveguide. On the other hand, a direct current (DC) electrode for a direct current signal (bias voltage) for adjusting the phase of light is disposed closer to the end portion of the optical fiber on the output side than the bent portion along the optical waveguide. Then, an RF signal is input to an RF electrode from an RF terminal provided on a side surface of a package or the like. Similarly, the bias voltage is input to a DC electrode from a DC terminal provided on the side surface of the package or the like.

Patent Literature: JP 2012-163876 A

Incidentally, in an optical module, a reception interface (hereinafter abbreviated as "reception IF") for externally receiving an RF signal used for modulating light in an optical modulator is often disposed at a position opposite to the end portion of the output optical fiber with the optical modulator interposed therebetween. Therefore, when light is folded back between the end portion of the input optical fiber and the end portion of the output optical fiber by a bent portion of the optical waveguide on the optical modulator chip, the RF electrode disposed on the end portion side of the input optical fiber may be formed at a position away from the reception IF of the RF signal. At this time, since it is difficult to separate the RF terminal for inputting an RF signal to the RF electrode from the RF electrode, the RF terminal and the RF terminal may be provided at a position away from the reception IF of an RF signal.

However, the longer the RF terminal is away from the reception IF of a RF signal, the longer the wiring connecting the RF terminal and the reception IF of an RF signal becomes. Therefore, in a case where light is folded back between the end portion of the input optical fiber and the end portion of the output optical fiber by the bent portion of the optical waveguide on the optical modulator chip in order to reduce the mounting area of the optical modulator, there is a problem that the propagation loss of an RF signal used for modulating light increases.

SUMMARY

According to an aspect of an embodiment, an optical module includes an optical modulator including an optical modulator chip having an optical waveguide having a light input end portion to which light from a light source is input, a light output end portion which outputs light to the transmission optical fiber, and a bent waveguide portion which is bent between the light input end portion and the light output end portion, a bias electrode to which a bias voltage is applied, the bias electrode being provided between the light input end portion and the bent waveguide portion along the optical waveguide, and a signal electrode to which the electric signal is input, the signal electrode being provided between the bent waveguide portion and the light output end portion along the optical waveguide; a bias input terminal electrically connected to the bias electrode and configured to input a bias voltage to the optical modulator; and a signal input terminal configured to input the electric signal to the optical modulator, the signal input terminal being provided closer to the other end than the bias input terminal and electrically connected to the signal electrode.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a block diagram illustrating an application example of the optical module.

DESCRIPTION OF EMBODIMENTS

Preferred embodiments of the present invention will be explained with reference to accompanying drawings. The disclosed technology is not limited to the embodiment.

[a] First Embodiment

Figure 1:
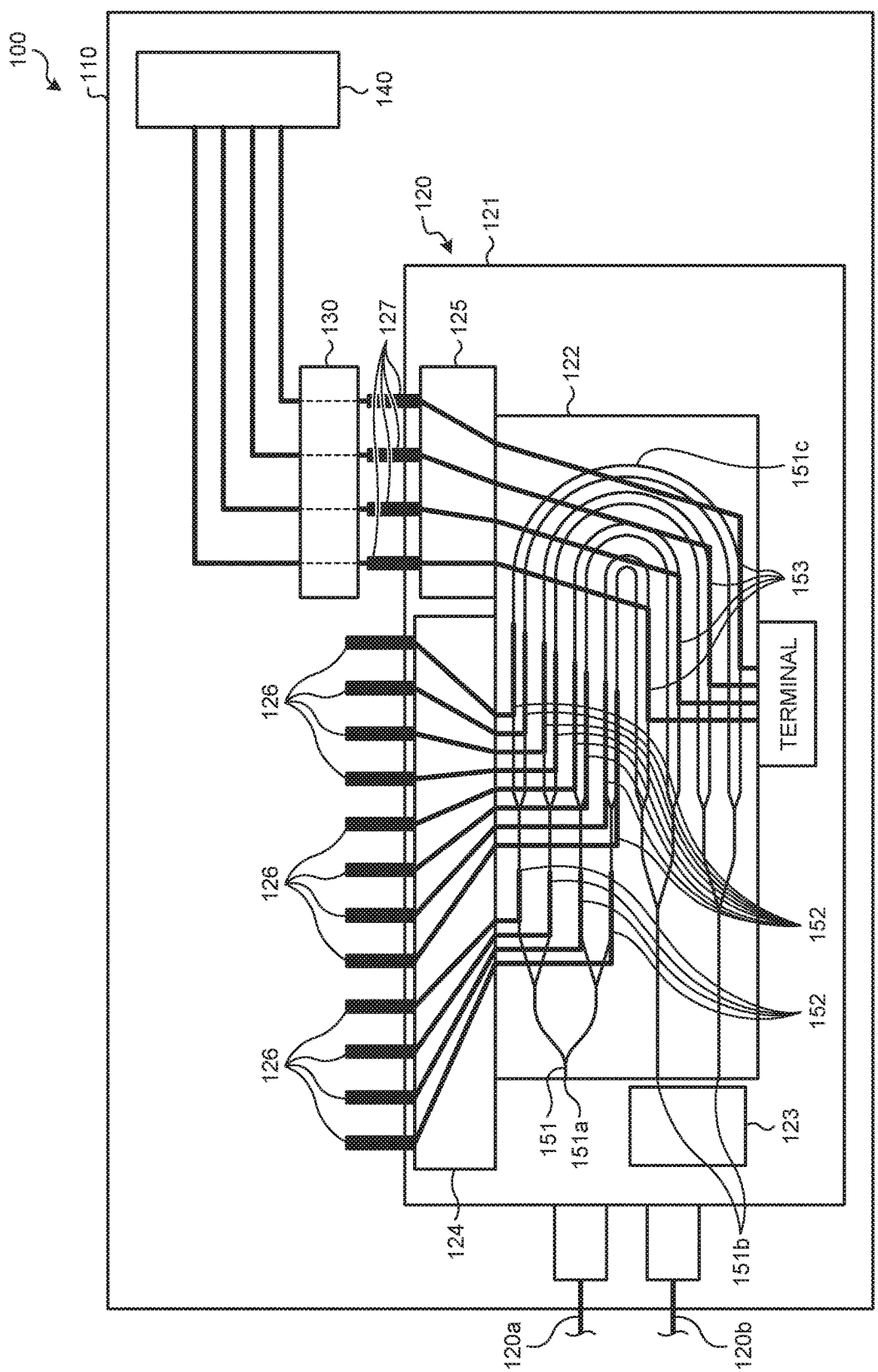
FIG. 1 is a schematic plan view illustrating a configuration of an optical module according to a first embodiment.

FIG. 1 is a schematic plan view illustrating a configuration of an optical module according to a first embodiment. In an optical module 100 illustrated in FIG. 1, an optical modulator 120 is provided. Although not illustrated in FIG. 1, at one end of the optical module 100, a reception optical fiber for inputting an optical signal from the outside and a transmission optical fiber for outputting an optical signal to the outside are connected. The other end of the optical module 100 is provided with a reception IF 140 for receiving an RF signal used for modulating light in the optical modulator 120. Specifically, the optical module 100 includes a printed circuit board 110, an optical modulator 120, a driver 130, and a reception IF 140.

The printed circuit board 110 is, for example, a glass epoxy board or the like, and is equipped with various components constituting the optical module 100. Although not illustrated in FIG. 1, a large scale integration (LSI) or the like for outputting a DC signal (that is, a bias voltage) which is a DC electric signal, for example, is mounted on the printed circuit board 110.

The optical modulator 120 is connected to an input optical fiber 120a and an output optical fiber 120b that are disposed in parallel. The optical fiber 120a receives light from the light source. The optical fiber 120b outputs an optical signal to the outside. The optical fiber 120a is an example of a first optical fiber and the optical fiber 120b is an example of a second optical fiber. The optical modulator 120 modulates light input from an end portion of the optical fiber 120a and outputs an optical signal to an end portion of the optical fiber 120b. At this time, the optical modulator 120 performs optical modulation based on an RF signal output as a high-frequency electric signal from the driver 130. Further, the optical modulator 120 performs phase control of the optical signal or the like based on a bias voltage output as a direct electric signal from the LSI. More specifically, the optical modulator 120 includes a package 121, an optical modulator chip 122, a polarization beam combiner (PBC) 123, a DC relay substrate 124, an RF relay substrate 125, a DC terminal 126, and an RF terminal 127.

The package 121 houses various components constituting the optical modulator 120.

The optical modulator chip 122 includes an optical waveguide 151, a signal electrode, and a ground electrode. The optical modulator chip 122 propagates light input from the end portion of the optical fiber 120a through the optical waveguide 151 and performs optical modulation to generate an optical signal. The optical modulator chip 122 has a DC electrode 152 for bias voltage and an RF electrode 153 for an RF signal as a signal electrode. The optical modulator chip 122 performs phase control of the optical signal or the like based on the bias voltage supplied from the DC terminal 126 to the DC electrode 152. Further, the optical modulator chip 122 performs optical modulation based on an RF signal supplied from the RF terminal 127 to the RF electrode 153.

The optical waveguide 151 is formed by forming a metal film such as titanium (Ti) on a part of a crystal substrate using an electrooptic crystal such as lithium niobate (LiNbO$_3$ (LN)) or lithium tantalate (LiTaO$_3$) and performing a thermal diffusion. The optical waveguide 151 includes a light input end portion 151a to which light from the optical fiber 120a is input, a light output end portion 151b for outputting light to the optical fiber 120b, and a bent waveguide portion 151c which is bent between the light input end portion 151a and the light output end portion 151b. Since the optical waveguide 151 has the bent waveguide portion 151c, the direction of light is changed between the end portion of the optical fiber 120a and the end portion of the optical fiber 120b. Accordingly, in the optical module 100, the optical fiber 120a and the optical fiber 120b disposed in parallel can be connected to one side of the optical modulator 120, and the mounting area of the optical modulator 120 is reduced.

The DC electrode 152 is disposed closer to the end portion of the optical fiber 120a than the bent waveguide portion 151c along the optical waveguide 151, and a bias voltage is applied to the DC electrode 152. That is, the DC electrode 152 is provided between the light input end portion 151a and the bent waveguide portion 151c along the optical waveguide 151, and a bias voltage is applied to the DC electrode 152. The DC electrode 152 is an example of a bias electrode.

On the other hand, the RF electrode 153 is disposed closer to the end portion of the optical fiber 120b than the bent waveguide portion 151c along the optical waveguide 151, and an RF signal is input to the RF electrode 153. That is, the RF electrode 153 is provided between the bent waveguide portion 151c and the light output end portion 151b along the optical waveguide 151, and an RF signal is input to the RF electrode 153. Depending on the disposition of the RF electrode 153, the output end of the RF electrode 153 faces the end portion of the optical fiber 120b, and the input end of the RF electrode 153 faces a side opposite to the end portion of the optical fiber 120b (that is, the side of the reception IF 140 described later). In addition, light propagating through the bent waveguide portion 151c is modulated by an RF signal input to the RF electrode 153, and the modulated light (that is, an optical signal) is output from the light output end portion 151b. As a result, it is avoided that an optical signal propagates through the bent waveguide portion 151c, so that the radiation loss of the optical signal in the bent waveguide portion 151c is suppressed. The RF electrode 153 is an example of a signal electrode.

The PBC 123 combines two optical signals output from the optical modulator chip 122 and outputs an optical signal including two polarized waves whose polarization directions are orthogonal. That is, the PBC 123 rotates the polarization direction of one optical signal output from the optical modulator chip 122, and then combines the one optical signal with the other optical signal.

The DC relay substrate 124 relays a bias voltage input from the DC terminal 126 to the optical modulator chip 122, and inputs the bias voltage to the DC electrode 152 of the optical modulator chip 122. The RF relay substrate 125 relays an RF signal input from the RF terminal 127 to the optical modulator chip 122, and inputs an RF signal to the RF electrode 153 of the optical modulator chip 122. In a case of inputting a plurality of electric signals to the optical modulator chip 122, if all the input portions of the electric signals are lined up on one side of the optical modulator 120, mounting becomes easy and the mounting area can be small. Therefore, in this embodiment, the DC relay substrate 124 and the RF relay substrate 125 are disposed in the optical modulator 120, and a bias voltage and RF signal input from one side of the optical modulator 120 are relayed to the optical modulator chip 122 by the DC relay substrate 124 and the RF relay substrate 125.

The DC terminal 126 is a lead terminal to which a DC bias voltage output from the LSI is input, is connected to the DC electrode 152, and inputs a bias voltage to the DC electrode 152. On the side surface of the optical modulator 120, the plurality of DC terminals 126 is provided, for example, in a line in accordance with the number of DC electrodes 152 provided in the optical modulator chip 122. Phase control of the optical signal obtained in, for example, the optical modulator chip 122 is performed by a bias voltage input from the DC terminal 126 to the DC electrode 152. The DC terminal 126 is an example of a bias input terminal.

The RF terminal 127 is a lead terminal to which a high frequency RF signal received by the reception IF 140 and amplified by the driver 130 is input, is connected to the RF electrode 153, and inputs the RF signal to the RF electrode 153. On a side surface of the optical modulator 120, a plurality of RF terminals 127 is provided, for example, in a line in accordance with the number of RF electrodes 153 provided in the optical modulator chip 122. By driving the optical modulator chip 122 with an RF signal input from the RF terminal 127 to the RF electrode 153, an optical signal in which light is modulated can be obtained. Note that the RF terminal 127 and the driver 130 are electrically connected by, for example, a coaxial connector or flexible printed circuits (FPC). The RF terminal 127 is an example of a signal input terminal.

Here, in the present embodiment, the RF terminal 127 is disposed closer to the reception IF 140 than the DC terminal 126, is connected to the RF electrode 153, and inputs an RF signal to the RF electrode 153. Specifically, the RF terminal 127 is disposed closer to the reception IF 140 than the DC terminal 126 along one side surface closer to the DC terminal 126 than the other side surface, out of two side surfaces in the lateral direction of the optical modulator chip 122, is connected to the RF electrode 153, and inputs an RF signal to the RF electrode 153. Therefore, as compared with the conventional configuration in which the RF electrode and the RF terminal are formed apart from the RF signal reception IF 140 as in the conventional case, in this embodiment, the RF terminal 127 can be brought closer to the reception IF 140. As a result, since wiring connecting the RF terminal 127 and the reception IF 140 can be shortened, it is possible to suppress the propagation loss of an RF signal received by the reception IF 140 and used for modulating light in the optical modulator 120.

The driver 130 generates an electric signal for modulating light input from the optical fiber 120a. That is, the driver 130 amplifies an RF signal received from the outside of the optical module 100 by the reception IF 140, and drives the optical modulator 120 according to the amplified RF signal.

The reception IF 140 is disposed on a side opposite to the end portion of the optical fiber 120b with the optical modulator 120 interposed therebetween, and receives an RF signal used for modulating light in the optical modulator 120. For example, the reception IF 140 receives an RF signal generated according to transmission data by a digital signal processor (DSP) disposed outside the optical module 100.

As described above, according to the present embodiment, an RF terminal that folds back the light by the bent portion of the optical waveguide on the optical modulator chip and inputs the RF signal to the RF electrode disposed closer to the end portion of the output optical fiber than the bent portion is disposed closer to the reception IF of the RF signal than the DC terminal. Thus, in the configuration in which the light is folded back by the bent portion of the optical waveguide on the optical modulator chip, the RF terminal can be brought close to the reception IF. As a result, since wiring connecting the RF terminal and the reception IF can be shortened, it is possible to suppress the propagation loss of the RF signal received by the reception IF and used for modulating light in the optical modulator while reducing the mounting area of the optical modulator.

[b] Second Embodiment

The optical module according to a second embodiment has the same configuration as the optical module 100 according to the first embodiment except for the disposition of the RF terminal. Therefore, in the second embodiment, the same reference numerals are used for constituent elements common to the first embodiment, and a detailed description thereof will be omitted.

Figure 2:
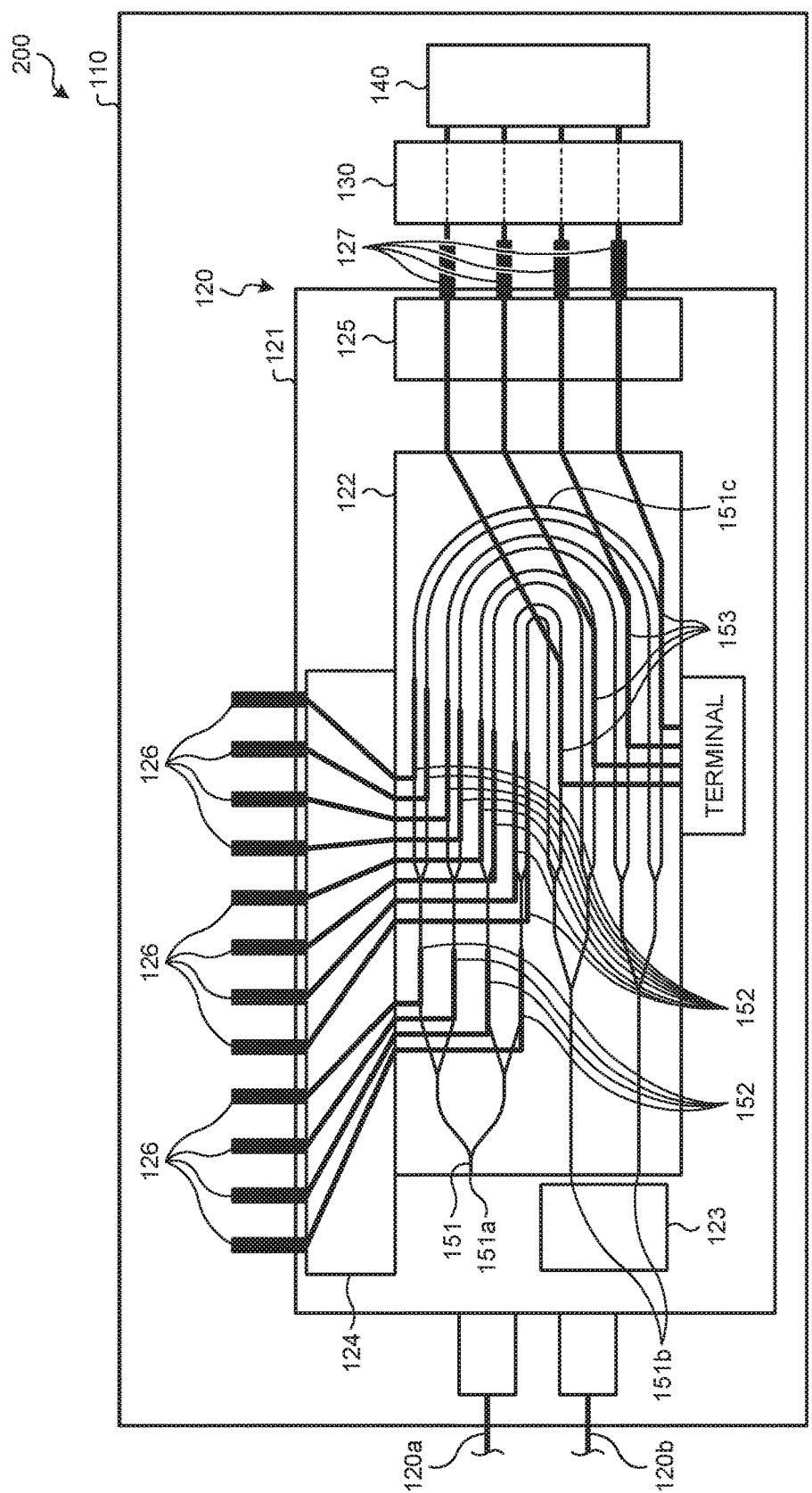
FIG. 2 is a schematic plan view illustrating a configuration of an optical module according to a second embodiment.

FIG. 2 is a schematic plan view illustrating a configuration of an optical module according to a second embodiment. In an optical module 200 illustrated in FIG. 2, an RF terminal 127 is arranged along one end surface closer to a reception IF 140 than the other end surface, out of the two end faces in the longitudinal direction of an optical modulator chip 122. As a result, the RF terminal 127 can be brought closer to the reception IF 140. As a result, wiring connecting the RF terminal 127 and the reception IF 140 can be made shorter, so that it is possible to further suppress the propagation loss of the RF signal.

[c] Third Embodiment

An optical module according to a third embodiment has the same configuration as the optical module 200 according to the second embodiment except that a driver is housed in a package. Therefore, in the third embodiment, the same reference numerals are used for constituent elements common to the second embodiment, and a detailed description thereof will be omitted.

Figure 3:
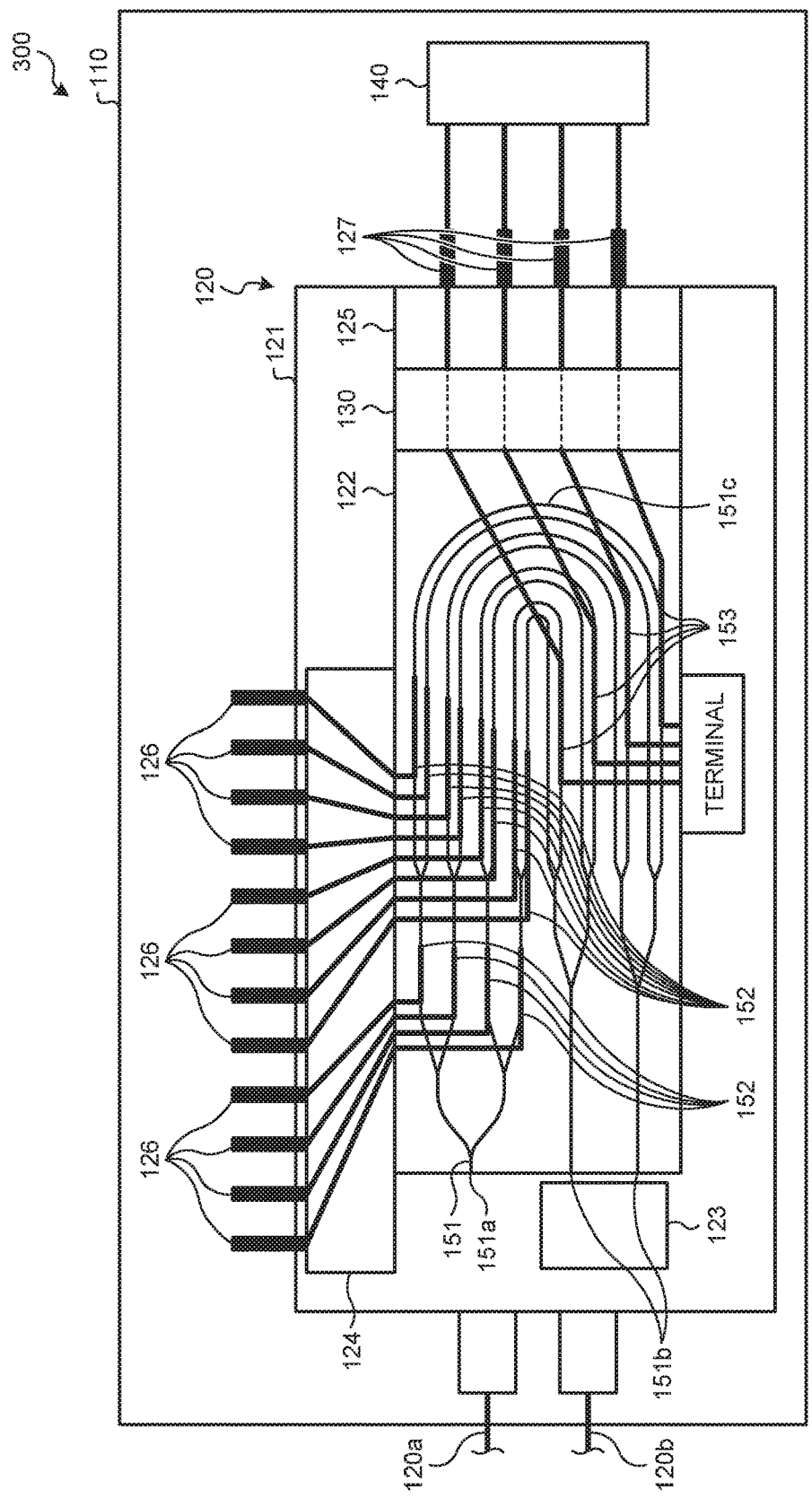
FIG. 3 is a schematic plan view illustrating a configuration of an optical module according to a third embodiment.

FIG. 3 is a schematic plan view illustrating the configuration of an optical module according to the third embodiment. In an optical module 300 illustrated in FIG. 3, a driver 130 is housed in an identical package 121 together with an optical modulator chip 122. Accordingly, it is possible to reduce the space for disposing the driver 130 outside the package 121.

[d] Fourth Embodiment

An optical module according to a fourth embodiment has the same configuration as the optical module 300 according to the third embodiment except for the disposition of the driver inside the package. Therefore, in the fourth embodiment, the same reference numerals are used for constituent elements common to the third embodiment, and a detailed description thereof will be omitted.

Figure 4:
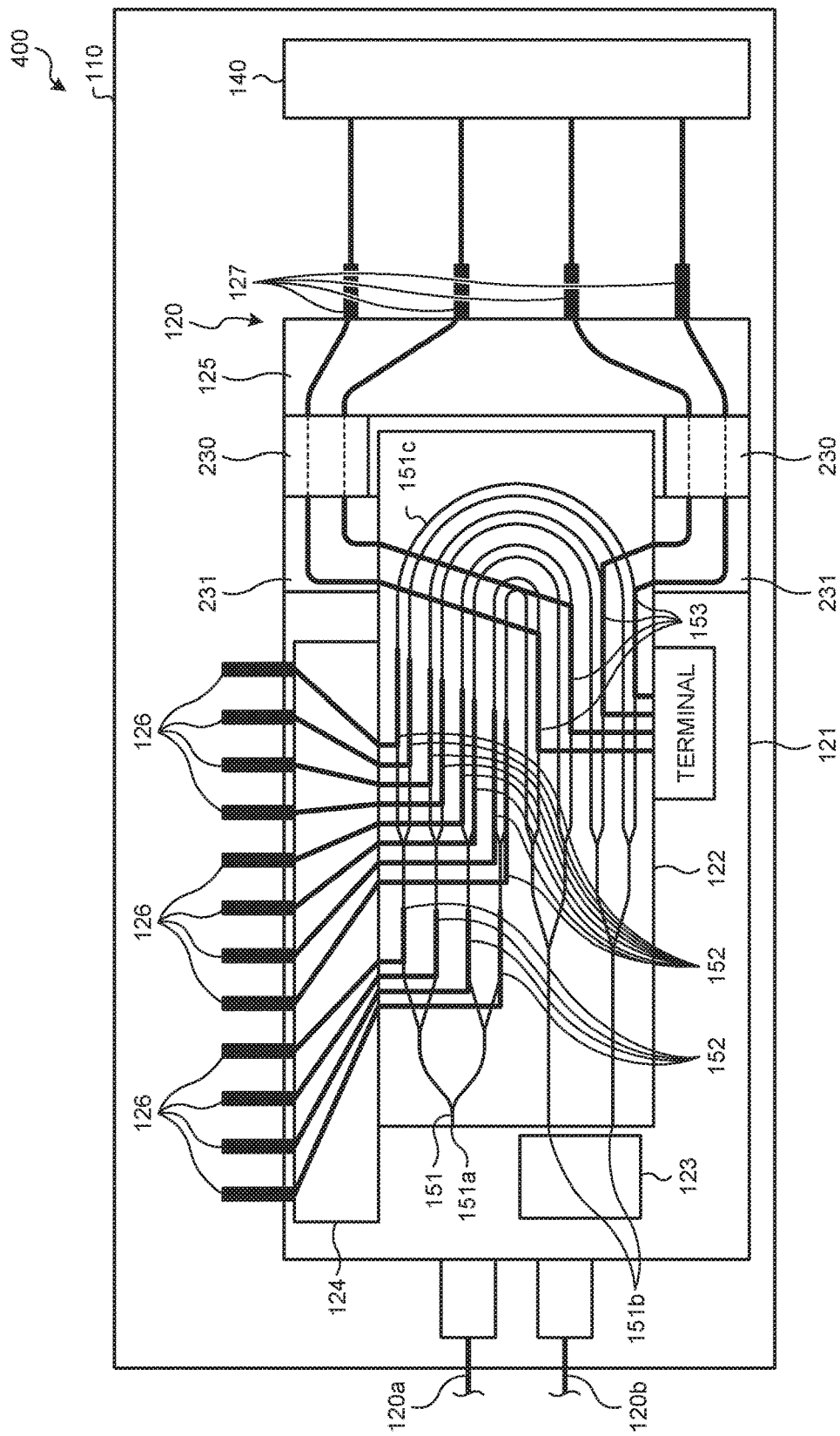
FIG. 4 is a schematic plan view illustrating a configuration of an optical module according to a fourth embodiment.

FIG. 4 is a schematic plan view illustrating the configuration of an optical module according to the fourth embodiment. An optical module 400 illustrated in FIG. 4 has a driver 230 in place of the driver 130 illustrated in FIG. 3. In a package 121, the driver 230 is disposed in two regions sandwiching an optical modulator chip 122 in the lateral direction of the optical modulator chip 122. Thus, in the package 121, two regions sandwiching the optical modulator chip 122 in the lateral direction of the optical modulator chip 122 can be effectively utilized as a region for the driver 230.

When the driver 230 is disposed in two regions sandwiching the optical modulator chip 122 in the lateral direction of the optical modulator chip 122, a plurality of channels corresponding to the number of the RF terminals 127 is dispersed in the two drivers 230. In the example of FIG. 4, among four channels corresponding to the four RF terminals 127, the upper two channels are provided in the upper driver 230 and the lower two channels are provided in the lower driver 230.

Further, the driver 230 is electrically connected to the optical modulator chip 122 via a relay substrate 231. Accordingly, it is possible to freely change the interval and direction of the channels in the relay substrate 231.

[e] Fifth Embodiment

An optical module according to a fifth embodiment has the same configuration as the optical module 400 according to the fourth embodiment except for the configuration of the relay substrate. Therefore, in the fifth embodiment, the same reference numerals are used for constituent elements common to the fourth embodiment, and a detailed description thereof will be omitted.

Figure 5:
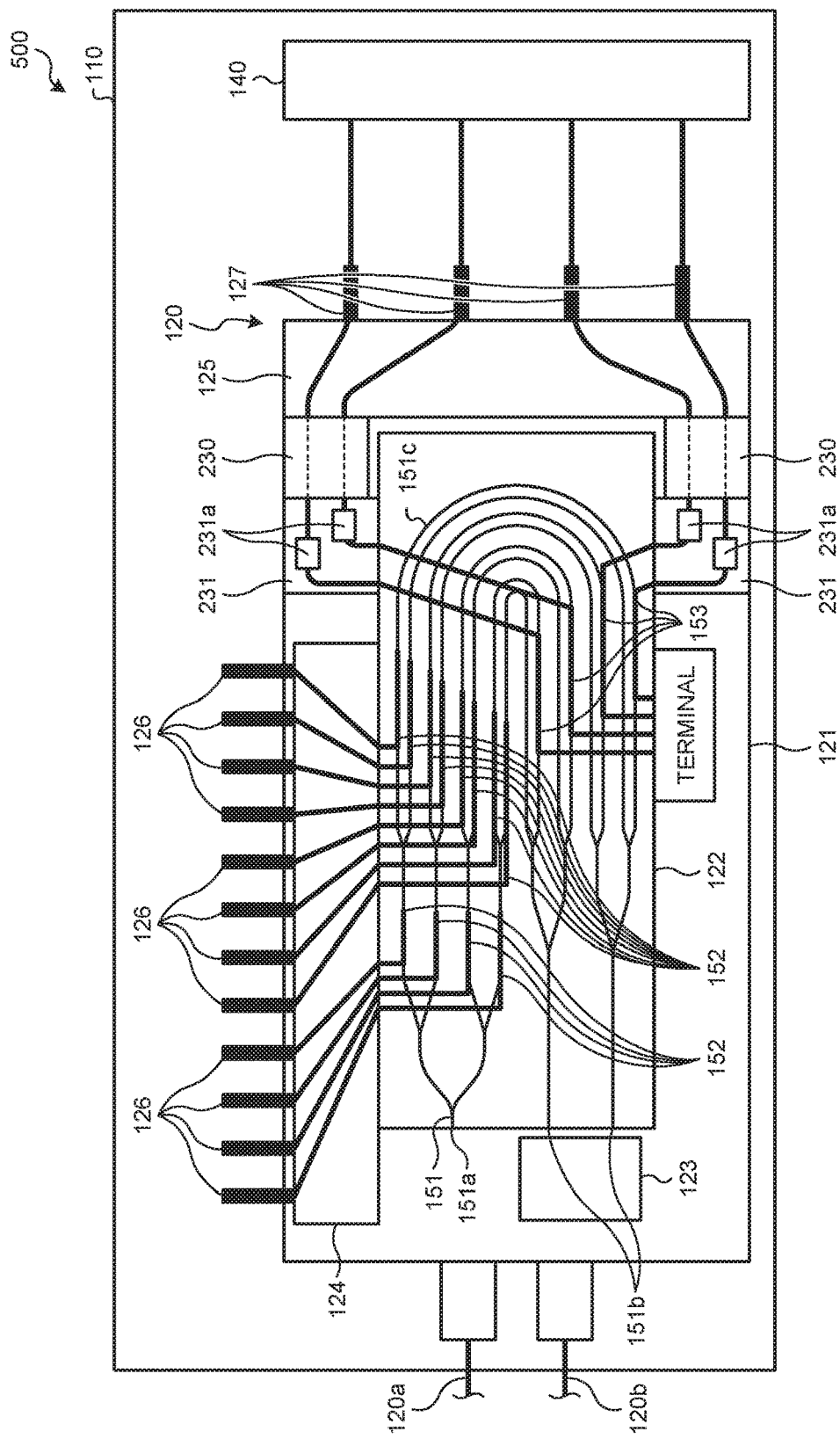
FIG. 5 is a schematic plan view illustrating a configuration of an optical module according to a fifth embodiment.

FIG. 5 is a schematic plan view illustrating the configuration of an optical module according to the fifth embodiment. In an optical module 500 illustrated in FIG. 5, a relay substrate 231 has a capacitor 231a. The capacitor 231a is a blocking capacitor that removes a DC component from an RF signal amplified by a driver 230. Since the capacitor 231a removes the DC component from the RF signal, the operation of an optical modulator chip 122 driven by the RF signal is stabilized. Accordingly, the accuracy of an optical signal generated by the optical modulator chip 122 can be improved.

Although omitted in FIG. 5, an inductor or the like that applies a bias voltage for adjusting the output level of the driver 230 to the driver 230 may be mounted on the relay substrate 231.

[f] Sixth Embodiment

An optical module according to a sixth embodiment has the same configuration as the optical module 100 according to the first embodiment except that a DC terminal and an RF terminal are each a BGA terminal, and the disposition of the RF relay substrate. Therefore, in the sixth embodiment, the same reference numerals are used for constituent elements common to the first embodiment, and a detailed description thereof will be omitted.

Figure 6:
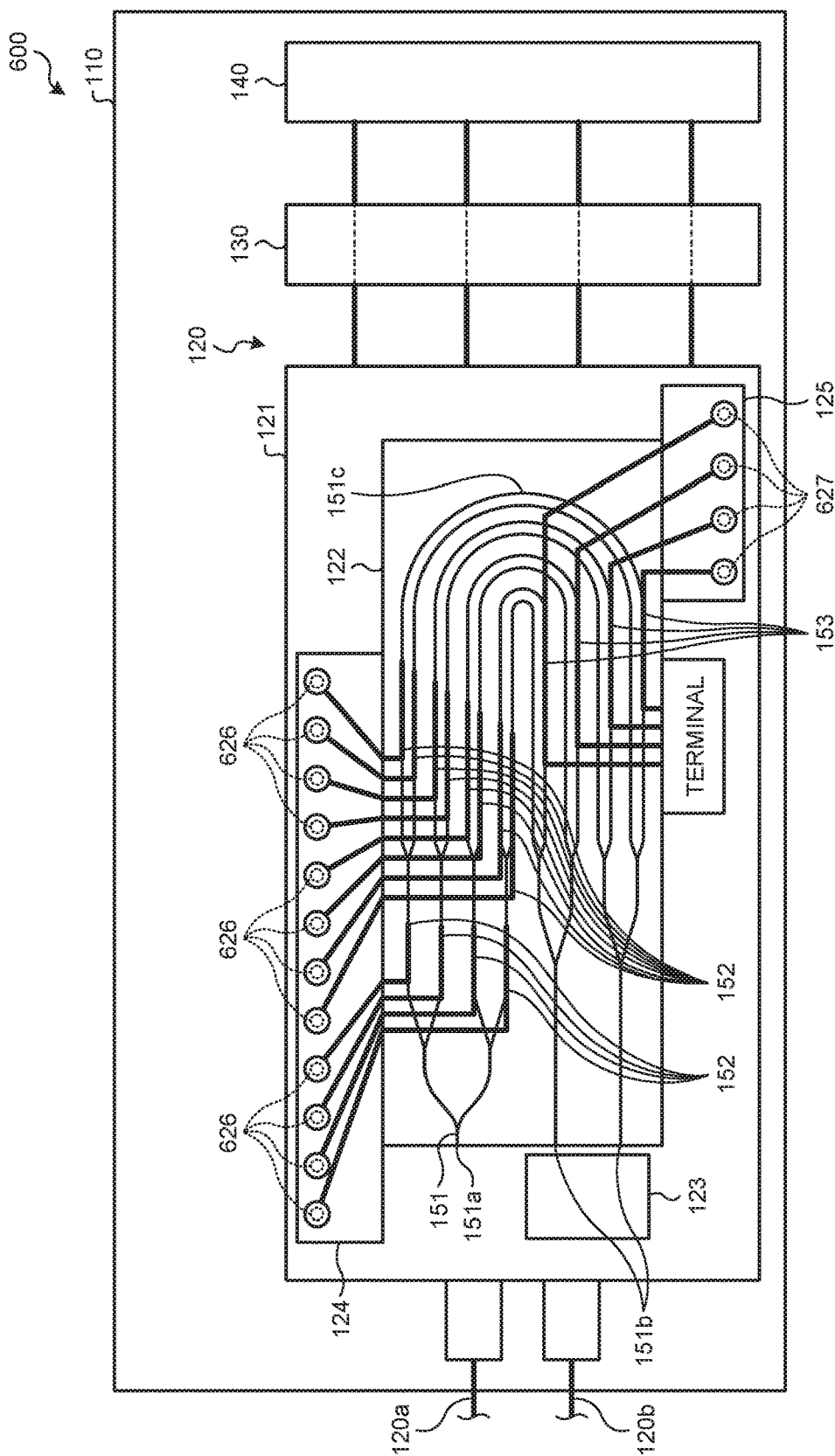
FIG. 6 is a schematic plan view illustrating a configuration of an optical module according to a sixth embodiment.

FIG. 6 is a schematic plan view illustrating the configuration of an optical module according to the sixth embodiment. In an optical module 600 illustrated in FIG. 6, an RF relay substrate 125 is provided on a side surface opposite to a side surface on which the DC relay substrate 124 is provided, out of the two side surfaces in the lateral direction of the optical modulator chip 122. In the optical module 600, the optical modulator chip 122 has a DC terminal 626 and an RF terminal 627 instead of the DC electrode 152 and the RF electrode 153 illustrated in FIG. 1.

The DC terminal 626 and the RF terminal 627 are a ball grid array (BGA) terminal provided on a bottom surface of the package 121 housing the optical modulator chip 122 and electrically connected to the DC electrode 152 or the RF electrode 153. That is, the DC terminal 626 is electrically connected to the DC electrode 152 via a through hole provided in the DC relay substrate 124, and the RF terminal 627 is electrically connected to the RF electrode 153 via a through hole provided in the RF relay substrate 125.

In this way, since the DC terminal 626 and the RF terminal 627 are each a BGA terminal, the optical module 600 can further reduce the mounting area as compared with the optical module 100 using the lead terminal.

In the sixth embodiment, the DC terminal 626 and the RF terminal 627 are each a BGA terminal, but at least one of the DC terminal 626 and the RF terminal 627 may be a BGA terminal.

Figure 7:
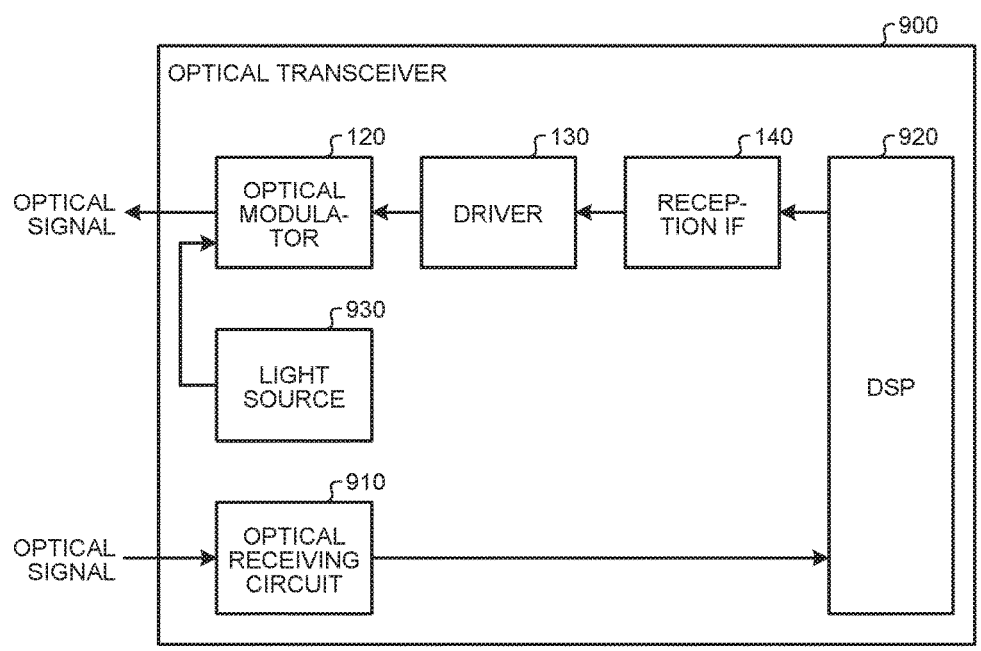
FIG. 7 is a block diagram illustrating a configuration example of an optical transmitter-receiver.

In addition, the optical module described in each of the above embodiments can be applied to, for example, an optical transmitter-receiver that transmits and receives an optical signal. FIG. 7 is a block diagram illustrating a configuration example of the optical transmitter-receiver. In FIG. 7, the same parts as those in FIG. 1 are denoted by the same reference numerals.

As illustrated in FIG. 7, an optical transceiver 900 includes an optical receiving circuit 910, a DSP 920, and a light source 930 in addition to an optical modulator 120, a driver 130, and a reception IF 140.

The optical receiving circuit 910 receives an optical signal, executes predetermined optical reception processing such as photoelectric conversion, and outputs the obtained reception signal to the DSP 920.

The DSP 920 performs various digital signal processing such as digital demodulation and digital decoding on the received signal output from the optical receiving circuit 910. In addition, the DSP 920 performs various digital signal processing such as encoding and digital modulation on the transmission data, and outputs the obtained RF signal to the reception IF 140 as a transmission signal. The RF signal output from the DSP 920 is received by the reception IF 140, amplified by the driver 130, becomes a high frequency RF signal for modulating the light, and drives the optical modulator 120.

The light source 930 includes, for example, a light emitting diode (LED) and supplies light that is optically modulated by the optical modulator 120. This light is optically modulated in accordance with an RF signal output from the driver 130 by the optical modulator 120 and then transmitted as an optical signal.

Further, the optical module described in each of the above embodiments can be further applied to an optical module 700 illustrated in FIG. 8. FIG. 8 is a block diagram illustrating an application example of the optical module. In FIG. 8, the same parts as those in FIG. 1 are denoted by the same reference numerals, and a detailed description thereof will be omitted.

As illustrated in FIG. 8, the optical module 700 is provided with the optical modulator 120 therein. Furthermore, at one end of the optical module 700, a reception optical fiber 710a for inputting an optical signal from the outside and a transmission optical fiber 710b for outputting an optical signal to the outside are connected. In addition, the other end of the optical module 700 is provided with a reception IF 140 for receiving an RF signal used for modulating light in the optical modulator 120. The optical module 700 includes a package 710, a printed circuit board 110, the optical modulator 120, the driver 130, the reception IF 140, a light source 720, and an optical receiver 730.

The package 710 is mounted on a substrate such as a plug-in unit (PIU) board, for example, and houses various components constituting the optical module 700. One end of the package 710 corresponds to one end of the optical module 100, and the other end of the package 710 corresponds to the other end of the optical module 700. That is, the reception optical fiber 710a and the transmission optical fiber 710b are connected to one end of the package 710. The reception optical fiber 710a is inserted into the package 710 through a penetrating member 717 provided at one end of the package 710 and connected to the optical receiver 730 via a ferrule 713. The transmission optical fiber 710b is inserted into the package 710 via a penetrating member 718 provided at one end of the package 710 to become the optical fiber 120b and the optical fiber 120b is connected to the optical modulator 120 via a ferrule 714. A connector 711 is provided on the other end of the package 710, and the reception IF 140 is provided in the connector 711.

A light source 720 includes, for example, an LED or the like. The light source 720 is connected to the optical fiber 120a via a coupler 721, and the optical fiber 120a is connected to the optical modulator 120 via a ferrule 715. Further, the light source 720 is connected to an optical fiber 120c via the coupler 721, and the optical fiber 120c is connected to the optical receiver 730 via a ferrule 716. Light emitted by the light source 720 is branched by the coupler 721, one light obtained by the branching is supplied to the optical modulator 120 via the optical fiber 120a, and the other light is supplied to the optical receiver 730 via the optical fiber 120c.

The optical receiver 730 receives an optical signal input from the reception optical fiber 710a, and extracts received data from the optical signal by causing the light input from the light source 720 via the coupler 721 and the optical fiber 120c to interfere with the optical signal.

In the optical modulator 120 illustrated in FIG. 8, a wiring pattern connecting the RF terminal 127 and the RF electrode 153 crosses an optical waveguide 151 so that the wiring pattern and the optical waveguide 151 are orthogonal to each other. This makes it possible to suppress the interference between the RF signal propagating through the wiring pattern and the light propagating through the optical waveguide 151.

According to one aspect of the optical module disclosed in the present application, there is an effect that the propagation loss of the electric signal used for modulating light can be suppressed while reducing the mounting area.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical module in which a reception optical fiber configured to input an optical signal from an outside and a transmission optical fiber configured to output an optical signal to the outside are connected to one end, and a receiver configured to receive an electric signal used for modulating light in the optical modulator is provided at another end opposite to the one end, comprising:
   an optical modulator including:
   an optical modulator chip having an optical waveguide having a light input end portion to which light from a light source is input, a light output end portion which outputs light to the transmission optical fiber, and a bent waveguide portion which is bent between the light input end portion and the light output end portion, a bias electrode to which a bias voltage is applied, the bias electrode being provided between the light input end portion and the bent waveguide portion along the optical waveguide, and a signal electrode to which the electric signal is input, the signal electrode being provided between the bent waveguide portion and the light output end portion along the optical waveguide;
   a bias input terminal electrically connected to the bias electrode and configured to input a bias voltage to the optical modulator; and
   a signal input terminal configured to input the electric signal to the optical modulator, the signal input terminal being provided closer to the other end than the bias input terminal and electrically connected to the signal electrode, wherein
   wiring pattern connecting the signal input terminal and the signal electrode is formed to cross the bent waveguide portion of the optical waveguide.

2. The optical module according to claim 1, wherein the signal input terminal is disposed along one end surface closer to the receiver than an other end surface, out of two end surfaces in a longitudinal direction of the optical modulator chip.

3. The optical module according to claim 1, wherein the optical modulator includes
   a driver configured to amplify the electric signal input from the signal input terminal to the signal electrode, and
   the driver is housed in an identical package together with the optical modulator chip.

4. The optical module according to claim 3, wherein in the package, the driver is disposed in two regions sandwiching the optical modulator chip in a lateral direction of the optical modulator chip.

5. The optical module according to claim 4, wherein the driver is electrically connected to the optical modulator chip via a relay substrate.

6. The optical module according to claim 5, wherein the relay substrate has a capacitor configured to remove a specific component from the electric signal amplified by the driver.

7. The optical module according to claim 1, wherein the bias input terminal or the signal input terminal or a combination thereof is a ball grid array (BGA) terminal provided on a bottom surface of a package housing the optical modulator chip and electrically connected to the bias electrode or the signal electrode.

8. The optical module according to claim 1, wherein wiring pattern connecting the signal input terminal and the signal electrode crosses the optical waveguide so that the wiring pattern and the optical waveguide are orthogonal to each other.

9. An optical modulator configured to modulate light input from a first optical fiber configured to input light from a light source and output a modulated optical signal to a second optical fiber configured to output an optical signal to an outside, in which the first optical fiber and the second optical fiber are connected to one end, the optical modulator comprising:
   an optical modulator chip having an optical waveguide having a light input end portion to which light from a light source is input, a light output end portion which outputs light to the second optical fiber, and a bent waveguide portion which is bent between the light input end portion and the light output end portion, a bias electrode to which a bias voltage is applied, the bias electrode being provided between the light input end portion and the bent waveguide portion along the optical waveguide, and a signal electrode to which the electric signal used for modulating light in the optical modulator is input, the signal electrode being provided between the bent waveguide portion and the light output end portion along the optical waveguide;
   a bias input terminal electrically connected to the bias electrode and configured to input a bias voltage to the optical modulator; and
   a signal input terminal configured to input the electric signal to the optical modulator, the signal input terminal electrically connected to the signal electrode, wherein
   wiring pattern connecting the signal input terminal and the signal electrode is formed to cross the bent waveguide portion of the optical waveguide.

10. The optical modulator according to claim 9, wherein the signal input terminal is disposed along one end surface closer to the receiver configured to receive the electric signal than an other end surface, out of two end surfaces in a longitudinal direction of the optical modulator chip.

11. The optical modulator according to claim 9, comprising
a driver configured to amplify the electric signal input from the signal input terminal to the signal electrode, wherein
the driver is housed in an identical package together with the optical modulator chip.

12. The optical modulator according to claim 11, wherein
in the package, the driver is disposed in two regions sandwiching the optical modulator chip in a lateral direction of the optical modulator chip.

13. The optical modulator according to claim 12, wherein
the driver is electrically connected to the optical modulator chip via a relay substrate.

14. The optical modulator according to claim 13, wherein
the relay substrate has a capacitor configured to remove a specific component from the electric signal amplified by the driver.

15. The optical modulator according to claim 9, wherein
the bias input terminal or the signal input terminal or a combination thereof is a BGA terminal provided on a bottom surface of a package housing the optical modulator chip and electrically connected to the bias electrode or the signal electrode.

16. The optical modulator according to claim 9, wherein wiring pattern connecting the signal input terminal and the signal electrode crosses the optical waveguide so that the wiring pattern and the optical waveguide are orthogonal to each other.

\* \* \* \* \*